United States Patent Office 3,045,013
Patented July 17, 1962

3,045,013
NEW OPTICAL BLEACHING AGENTS OF THE DIAMINO STILBENE SERIES
Raymond Frey, Creil, France, assignor to Compagnie Francaise des Matieres Colorantes, Paris, France, a French company
No Drawing. Filed June 9, 1959, Ser. No. 819,021
Claims priority, application France, June 11, 1958
6 Claims. (Cl. 260—240)

The present invention concerns improvements in and relating to optical bleaching agents.

According to the present invention new optical bleaching agents are provided of the general formula:

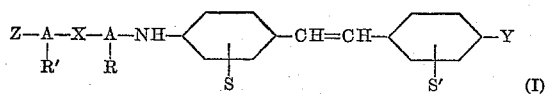

in which A represents the trivalent radical of 1,3,5-triazine, S and S' represent solubilising groups such as sulphonic, carboxyl and sulphonamido groups, X represents a sulphur atom, an imino group which may be substituted, or a divalent, saturated or unsaturated, carbon chain, without solubilising groups and containing heteroatoms at its ends, Y represents an amino, acylamino, ureido which may be substituted, —NH—A(RR') or —NH—A(R)—X—A(RR') group, the substituents R and R' represent halogen atoms or hydroxyl, amino or substituted amino groups, or organic residues linked to the carbon atom of the triazine ring by an oxygen or sulphur atom, and Z has the same significance as R and R' or represents a group of the formula:

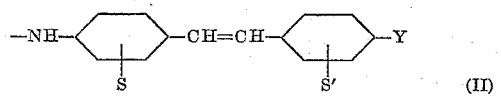

in which S, S' and Y have the same significance as before.

The compounds of the general Formula I may be obtained by various methods such as the following:

According to the first method, two molecules of cyanuric chloride or bromide are reacted with one molecule of 4,4'-diamino-stilbene containing solubilizing groups, then there are condensed with the product in any order, but symmetrically with regard to the central stilbene molecule, two molecules of ammonia, of a primary amine, of a diamine, of a dialcohol or of a diphenol, and the compound thus obtained is reacted with two more molecules of cyanuric chloride or bromide, of which the halogen atoms are retained or substituted in any arrangement by OH, amino, alkoxy, aryloxy or alkylthio groups. There are thus obtained products of the general formula:

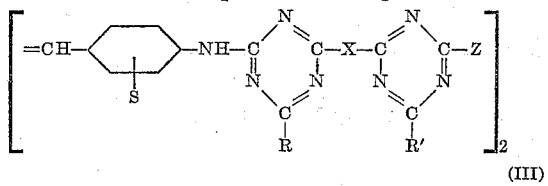

Likewise, a molecule of cyanuric chloride or bromide may be reacted with the free amino group of a compound of the general formula:

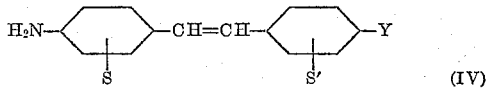

and one molecule of ammonia, a primary amine, a diamine, a dialcohol or a diphenol condensed with the product, the compound thus obtained then reacted with another molecule of cyanuric chloride or bromide, of which the halogen atoms are retained or substituted wholly or in part and in any order by hydroxyl, amino, alkoxy, aryloxy or alkylthio groups. Products of the general Formula I are finally obtained.

Again, one can start from a molecule of a 4-amino-4'-nitro-stilbene containing solubilising groups, react therewith a molecule of cyanuric chloride or bromide, retain the triazine halogen atoms or substitute them, wholly or partly, by hydroxyl, amino, alkoxy, aryloxy or alkylthio groups, and then reduce the nitro group to an amino group and condense with a molecule of cyanuric chloride or bromide. The resulting compound is then condensed with one molecule of ammonia, a primary amine, a diamine, a dialcohol or a diphenol, and the other halogen atoms may if desired be substituted by hydroxyl, amino, alkoxy, aryloxy or alkylthio groups. A last molecule of cyanuric chloride or bromide is finally condensed with the product and the remaining halogen atoms may be substituted as before, if desired.

It is also possible to condense two molecules of cyanuric chloride or bromide with one molecule of ammonia, a primary amine, a dialcohol, a diphenol, a diamine or sodium sulphide, to condense two molecules of the product thus obtained with one molecule of 4,4'-diamino-stilbene containing solubilising groups, and to substitute if desired, in any order, the remaining halogen atoms by hydroxyl, amino, alkoxy, aryloxy or alkylthio groups.

In addition, two molecules of cyanuric chloride or bromide can be condensed with one molecule of ammonia, a primary amine, a dialcohol, a diphenol, a diamine or sodium sulphide, and one molecule of the product thus obtained condensed with one molecule of a product of the general Formula IV, and the remaining halogen atoms if desired substituted as before.

The compounds of the general Formula I are preferably used as optical bleaching agents in the form of their alkali metal salts in solution in water. The natural textile fibres, cotton in particular, are very greatly improved. The same applies to certain synthetic fibres such as, for example, "nylon." These compounds may be applied with equal success, by dyeing or foularding to fabrics or yarns of cellulosic or synthetic fibres. They can be incorporated in finishing baths or printing pastes. The very special structure of these products confers on them a great affinity for cellulosic fibres; their final shades of fluorescence are extremely varied and by adding to paper pulp, they improve the brilliancy and may if desired correct the dominant colour of the latter. The compounds of Formula I can also be applied to cellulose, regenerated or not, to artificial and vegetable fibres, light leathers, threads, films of any form, and to straw.

The optical bleaching agents according to the invention possess a remarkable stability towards oxidising agents, more especially hypochlorites. Owing to their excellent resistance to light and their perfect compatibility with the conventional alkali metal soaps and detergents which make up the washing powders used in laundering, these compounds are auxiliary products of very great interest.

The invention will be more clearly understood by reference to the following examples which are purely illustrative and in which the parts mentioned are parts by weight.

*Example 1*

370 parts of cyanuric chloride (or the corresponding amount of cyanuric bromide) dissolved in 1110 parts of acetone are added, while stirring, to an aqueous neutral solution of 414 parts of the sodium salt of 4,4'-diamino-stilbene-2,2'-disulphonic acid cooled to between 0° C. and 5° C. The pH of the reaction mixture is kept weakly acid by the simultaneous addition of a sufficient quantity of a 10% aqueous solution of sodium carbonate. This first stage is ended when free 4,4'-diamino-stilbene-2,2'-disulphonic acid no longer exists in the reaction mixture. After having raised the temperature to around 30° C., 170 parts of a 20% solution of ammonia are added and the reaction mixture is agitated until the pH becomes acid.

The hydrochloric acid formed is then neutralised by a sufficient amount of a 10% aqueous solution of sodium carbonate. The reaction mixture is again cooled to a temperature between 0° C. and 5° C., and 370 parts of cyanuric chloride (or the corresponding quantity of cyanuric bromide) dissolved in 1110 parts of acetone are slowly added with stirring. During this condensation, the acidity of the mixture is maintained at a pH between 5.5 and 6.5 by the simultaneous addition of a sufficient amount of a 10% aqueous solution of sodium carbonate. A suspension is thus obtained of 859 parts of N,N'-[(2''',4'''-dichloro-1''',3''',5'''-triazine-yl)-2''-amino - 4''-chloro-1'',3'',5''-triazine-yl]-4,4'-diamino - stilbene - 2,2'-disulphonic acid of formula:

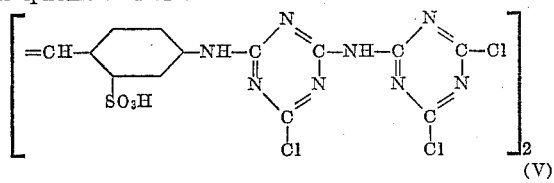

Then 518 parts of aniline hydrochloride are introduced into this suspension and the temperature is raised to 40° C. while maintaining the reaction mixture weakly acid by the addition of 4240 parts of a 10% solution of sodium carbonate. Agitation is continued until it is no longer possible to detect the presence of free aniline in a sample from the reaction mixture. The atoms of chlorine occupying the 4'' and 4''' positions on the triazine rings are thus substituted by four phenylamino groups. The reaction mixture is again made alkaline by 1060 parts of a 10% solution of sodium carbonate and heated to around 90° C. The acetone which distils off is recovered. This temperature is maintained for some hours with stirring until the pH of the mixture has returned to neutral. This hydrolysis has the object of replacing the atoms of triazine chlorine occupying the 2''' positions with hydroxyl groups. The sodium salt of N,N'[(2'''-hydroxy-4'''-phenylamino-1''',3''',5'''-triazine-yl)-2'' - amino - 4''-phenylamino-1'',3'',5''-triazine-yl]-4,4'-diamino - stilbene-2,2'-disulphonic acid is precipitated on the addition to the cooled solution of 15 parts of sodium chloride for each 100 parts of reaction mixture, and is drained and dried at 60° C. There is finally obtained in good yield a light yellow powder, very soluble in water, of the formula

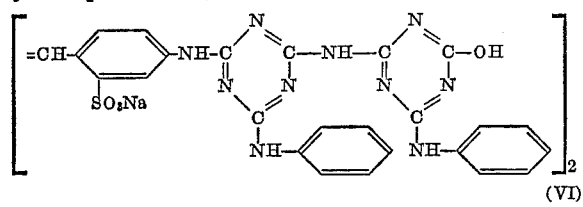

(VI)

*Example 2*

One operates as in Example 1, but with the difference that, after having condensed the four phenylamino groups on the molecule, 122 parts of monoethanolamine are introduced into the reaction mixture and it is heated at 45° C. for an hour while keeping the pH slightly alkaline by the continuous addition of a 10% aqueous solution of sodium carbonate. The acetone is removed by distillation, and the remainder cooled, salted out, the precipitate drained and dried. A light yellow product, soluble in water, is obtained of the formula:

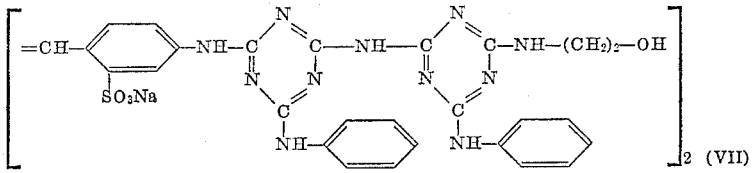

*Example 3*

The procedure is as in Example 2, except that the 122 parts of monoethanolamine are replaced by 34 parts of ammonia or 62 parts of methylamine or 90 parts of the dimethylamine or 90 parts of ethylamine or 146 parts of diethylamine or 150 parts of β-methoxy-ethylamine or 174 parts of morpholine or 210 parts of N,N-bis-(hydroxyethyl)-amine. Products endowed with equivalent properties are obtained.

*Example 4*

The process is carried out as in Example 1 except for the difference that 848 parts of sodium sulphanilate are employed instead of the 518 of aniline hydrochloride. When the condensation is ended, one proceeds as in Example 2 by reacting with the product either 34 parts of ammonia, 62 parts of methylamine, 90 parts of dimethylamine, 146 parts of diethylamine, 174 parts of morpholine, 150 parts of β-methoxy-ethylamine or 210 parts of N,N-bis-(hydroxyethyl)amine. Products endowed with equivalent properties are obtained.

*Example 5*

To the aqueous-acetone suspension of 859 parts of the compound of Formula V are added 348 parts of morpholine and the temperature is raised to 70° C. while stirring and keeping the pH of the reaction mixture weakly acid by the progressive addition of a 10% aqueous solution of sodium carbonate. The acetone is removed by distillation and 122 parts of monoethanolamine are then introduced. The temperature is then raised to 90° C. and maintained at this level for two hours by continual agitation. After cooling, salting out, draining and drying the precipitate, a light yellow product of the following formula, which is very fluorescent in an aqueous medium under the influence of ultra-violet radiation, is obtained in excellent yield:

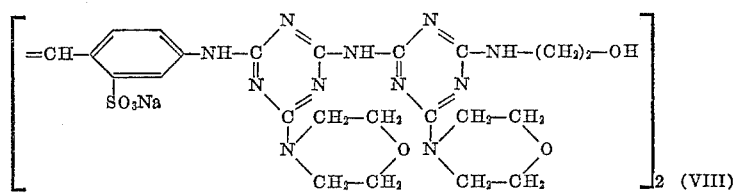

If instead of the monoethanolamine, 1060 parts of a solution of sodium carbonate are reacted and the temperature of the mixture is maintained at 90–95° C. for five hours while stirring, a product is obtained of the formula

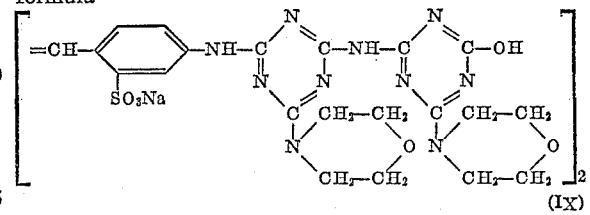

Finally, if for the same quantity of the compound of Formula V 522 parts of morpholine are used instead of 348, and the mixture is heated for 3 hours at 70° C. with stirring and kept weakly acid by addition of a 10% solution of sodium carbonate, there is obtained in very good yield after isolation a greenish yellow product of the formula:

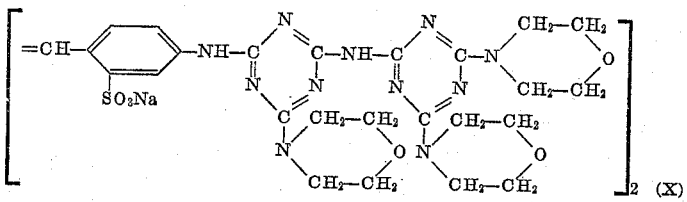

Example 6

370 parts of cyanuric chloride (or the corresponding amount of cyanuric bromide) are condensed according to the process of Example 1 with 414 parts of the sodium salt of 4,4'-diamino-stilbene-2,2'-disulphonic acid. When this first stage is finished, the temperature is raised to 30° C. and 125 parts of a 95% solution of 1,2-ethylenediamine are slowly added with stirring. The hydrochloric acid formed is neutralised by a sufficient quantity of a 10% solution of sodium carbonate. The reaction mixture is recooled to a temperature between 0° C. and 5° C. and a solution of 370 parts of cyanuric chloride in 1110 parts of acetone is slowly added, while keeping up an effective agitation. The pH of the mixture is maintained at a value around 5 during this condensation by the addition of successive fractions of 1060 parts of a 10% solution of sodium carbonate. 348 parts of morpholine are then added. The temperature is raised to 70° C. and kept at this level for three hours. A weak acidity is maintained in the reaction mixture by the addition of successive fractions of 2120 parts of a 10% solution of sodium carbonate, and the temperature is raised to between 90° C. and 95° C. The acetone which distils off is recovered. This temperature is maintained for some hours while stirring until the pH of the mixture has returned to the neutral point. The sodium salt of N,N'-[(2'''-hydroxy - 4''' - morpholyl - 1''',3''',5''' - triazine-yl)2''-amino - ethylamino - 4'' - morpholyl-1'',3'',5''-triazine-yl]-4,4'-diamino-stilbene-2,2'-disulphonic acid precipitates on the addition to the solution cooled to 10° C. of 15 parts of sodium chloride for each 100 parts of reaction mixture. The precipitate is drained, washed and dried at 60° C. A faintly yellow-coloured product, soluble in water, of the following formula is thus isolated in excellent yield:

Example 7

170 parts of a 20% solution of ammonia are slowly added, with stirring, to a solution of 370 parts of cyanuric chloride in 1110 parts of acetone, cooled to between 0° C. and 5° C. The reaction mixture is progressively neutralised by the addition of 1060 parts of a 10% aqueous solution of sodium carbonate. 370 additional parts of cyanuric chloride in the form of a solution in 1110 parts of acetone are then introduced while keeping up good agitation and maintaining the temperature between about 0° C. and 5° C. The acid liberated is progressively neutralised by a solution of sodium carbonate. Into the suspension thus formed is slowly introduced, with good agitation, an aqueous solution of 414 parts of the sodium salt of 4,4'-diamino-stilbene-2,2'-disulphonic acid, the temperature being maintained at between 0° C. and 5° C. The pH of the reaction mixture is kept at a slightly acid value by the addition of a sufficient quantity of a 10% aqueous solution of sodium carbonate. The absence of free 4,4'-diamino-stilbene-2,2'-disulphonic acid in the reaction mixture is verified and, after having raised the temperature of the mixture to 35–40° C., an aqueous solution of 232 parts of sodium phenate is introduced. Agitation is maintained until it is no longer possible to detect the presence of uncondensed phenol in a sample.

348 parts of morpholine are then added in successive fractions so as to keep the reaction mixture faintly acid. The temperature is progressively raised to 70° C. The mixture is neutralised by the introduction in several fractions of a sufficient quantity of a 10% solution of sodium carbonate, and the acetone which distils off is condensed and recovered. The solution is cooled, salted out by the addition of 15 parts of sodium chloride per 100 parts of reaction mixture, and the precipitate obtained dried at 60° C. After grinding, the latter is in the form of a slightly yellow-coloured powder, very soluble in water, of the formula:

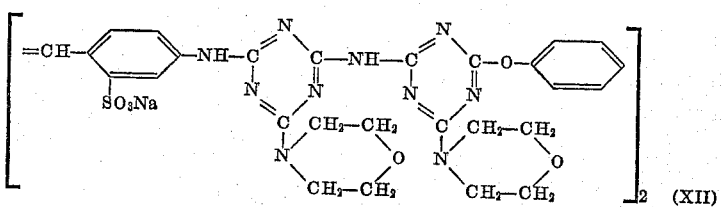

Example 8

To a solution of 740 parts of cyanuric chloride in 2220 parts of acetone cooled to between 0° C. and 5° C. are slowly added, with efficient stirring, 1560 parts of a

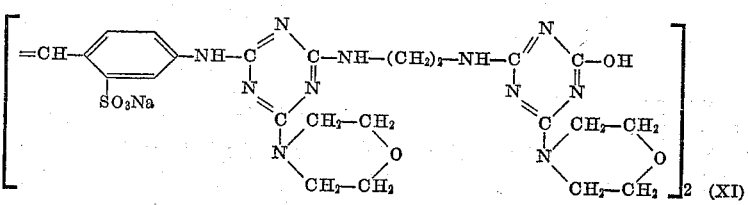

10% aqueous solution of sodium sulphide. The reaction is ended when it is no longer possible to detect the presence of sodium sulphide in the free state in the reaction mixture. Then 660 parts of an intermediate product of the formula:

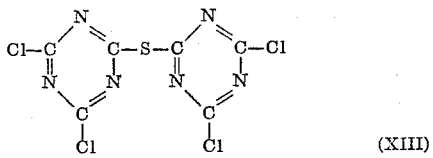

are held in suspension in the water-acetone medium.

An aqueous solution of 414 parts of the sodium salt of 4,4'-diamino-stilbene-2,2'-disulphonic acid are slowly introduced, with good agitation, into this suspension maintained at between 20° C. and 25° C. The acidity resulting from the condensation is neutralised as it is formed by the addition of a sufficient quantity of a 10% solution of sodium carbonate. A yellow hexachloro product is obtained which, under conditions the same as those described in Example 5, is capable of combining with 348 parts of morpholine by heating at 70° C. in a slightly acid medium. Two hydroxyl groups are substituted for the two remaining atoms of triazine chlorine by alkaline hydrolysis. Finally a light yellow product, very fluorescent in aqueous solution, of the following formula is isolated in good yield.

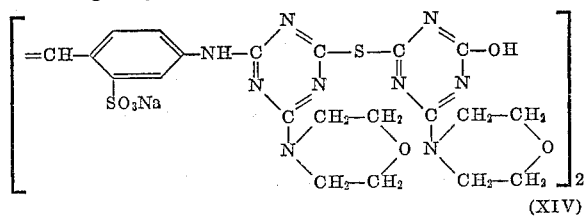

Example 9

One operates as in Example 8, but with the difference that, after the condensation with morpholine, 34 parts of ammonia or 62 parts of methylamine or 90 parts of ethylamine or 90 parts of dimethylamine or 146 parts of diethylamine or 122 parts of β-hydroxy-ethylamine or 210 parts of N,N-bis-(hydroxyethyl)-amine or 150 parts of β-methoxy-ethylamine or 174 parts of morpholine are introduced into the reaction mixture. The procedure is then as indicated in Example 2. Compounds endowed with equivalent properties are obtained.

Example 10

The hexahalogenated product obtained in Example 8 is condensed in a weakly alkaline medium with 376 parts of phenol in the form of an aqueous solution of sodium phenate, at a temperature of 55° C. to 40° C. When it is no longer possible to detect free phenol in the reaction mixture, the two last remaining chlorine atoms are substituted by 122 parts of β-hydroxyethylamine or 90 parts of ethylamine or 174 parts of morpholine. The procedure is then as indicated in Example 9. Compounds endowed with analogous properties are obtained.

Example 11

The hexahalogenated product obtained in Example 8

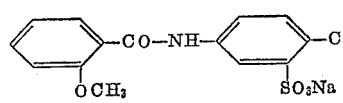

is condensed in a weakly alkaline medium with 366 parts of β-hydroxyethylamine or 270 parts of dimethylamine. While keeping the pH of the mixture at a slightly acid value during the whole reaction, 518 parts of aniline used in the form of the hydrochloride are condensed with the hexahalogenated product obtained in Example 8, while heating under reflux and progressively neutralising by means of an aqueous solution of sodium carbonate. The new products thus prepared have very similar properties and are practically only differentiated by their respective solubilities in an aqueous medium.

Example 12

85 parts of a 20% solution of ammonia are slowly added with stirring to a solution of 370 parts of cyanuric chloride in 1110 parts of acetone, cooled to between 0° C. and 5°C. The reaction mixture is progressively neutralised by the addition of 1060 parts of a 10% solution of sodium carbonate. Then 174 parts of morpholine are added in fractions to the suspension thus formed, so as to keep the well stirred reaction mixture slightly acid. During the whole of this condensation the temperature is allowed to rise to about 20° C. The mixture is neutralised by the fractional introduction of 1060 parts of a 10% aqueous solution of sodium carbonate and 414 parts of an intermediate product of the following formula are obtained in suspension in the water-section medium:

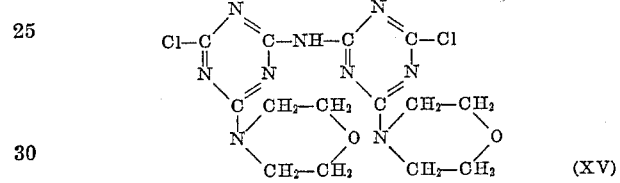

A neutral aqueous solution of 444 parts of the sodium salt of 4-amino-4'-nitro-stilbene-2,2'-disulphonic acid is added with good agitation to this suspension maintained at a temperature below 40° C. The pH of the reaction medium is kept weakly acid by the simultaneous addition of a sufficient quantity of 10% sodium carbonate. Under these conditions, a light yellow product is obtained which it is no longer possible to diazotise.

The reaction mixture is then raised to a temperature of 45° C. and an aqueous solution of 151 parts of sodium ortho-chlorophenate is added with good agitation. This temperature and the agitation are maintained for some hours until the presence of ortho-chlorophenol can no longer be detected in a sample of the reaction mixture. The nitro group contained in the molecule of the product thus prepared is then reduced. The reduction is effected by the technique of Béchamp, using in aqueous medium at boiling point 125 parts of iron which is acted upon by 20 parts of glacial acetic acid. A solution of 204 parts of 2-methoxy-benzoyl chloride in 300 parts of acetone is reacted with the amine thus produced. During this condensation good agitation is maintained, and the temperature is regulated to about 10-12° C. The pH of the medium is kept at a figure slightly over 7 by the introduction in successive fractions of 550 parts of a 10% solution of sodium carbonate. The reaction product is salted out and the precipitate drained, washed with a solution of 5% sodium bicarbonate and dried at 60° C. After grinding, a light yellow product, soluble in water, of the following formula is obtained in excellent yield:

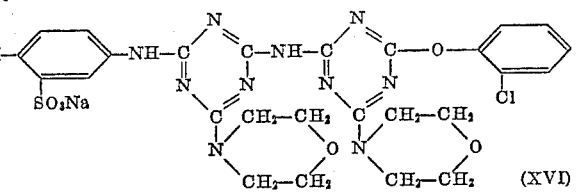

Example 13

A suspension of 660 parts of the intermediate product of Formula XIII in aqueous acetone is prepared according to the process described in Example 8, and one of the chlorine atoms of this compound is replaced by a phenoxy radical by introducing into the reaction mixture, raised to a temperature of 35–40° C., an aqueous solution of 116 parts of sodium phenate. The condensation is finished when it is no longer possible to detect the presence of free phenol in the reaction mixture. A second chlorine atom is then replaced by a phenylamino radical by introducing into the suspension of the product an aqueous solution of 130 parts of aniline hydrochloride. The pH of the medium is kept slightly acid by addition of a 10% solution of sodium carbonate, and stirring is continued until the aniline has completely condensed. An aqueous solution of 444 parts of the sodium salt of 4-amino-4'-nitro-stilbene-2,2'-disulphonic acid is then added to the aqueous-acetone suspension of the product of formula:

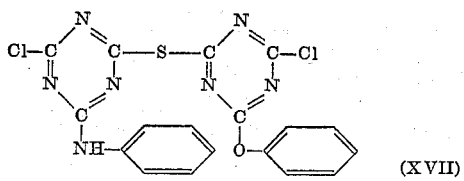

(XVII)

The mixture is cooled to about 20° C. and kept slightly acid by the progressive addition of 530 parts of a 10% solution of sodium carbonate. The last remaining atom of triazine chlorine is replaced by a morpholine radical by introducing into the reaction mixture 87 parts of morpholine in successive fractions and neutralising the acidity as it is produced by corresponding amounts of a 10% aqueous solution of sodium carbonate. During the whole of this condensation the reaction temperature is raised progressively to 70–75° C. The acetone which distils off is recovered. The nitro group present in the molecule is reduced by the usual technique with iron and acetic acid. Let the mixture obtained be called A.

A suspension in aqueous acetone is prepared of 476 parts of the intermediate product of the formula:

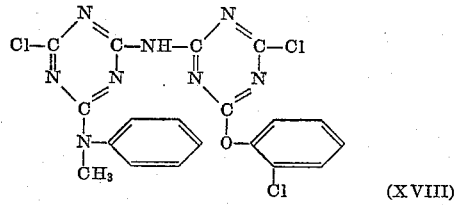

(XVIII)

by the following process: 86 parts of a 20% solution of ammonia is run slowly with stirring into a solution of 185 parts of cyanuric chloride in 555 parts of acetone, cooled to between 0° C. and 5° C., the acidity of the reaction mixture is progressively neutralised by the addition of 530 parts of a 10% aqueous solution of sodium carbonate, and a further 185 parts of cyanuric chloride in solution in 555 parts of acetone are introduced, the reaction mixture is neutralised by the addition of 530 parts of a 10% aqueous solution of sodium carbonate, 143.5 parts of N-methylaniline hydrochloride are then added to the suspension thus formed and the acidity produced is progressively neutralised by a solution of sodium carbonate so as to keep a slightly acid pH in the reaction mixture. During the whole of this reaction the temperature is maintained at between 40° C. and 45° C. Finally, 150.5 parts of sodium chlorophenate in aqueous solution are introduced into the mixture with stirring and the temperature is kept at 40–45° C. The reaction is finished when o-chlorophenol is no longer detected in the aqueous-acetone suspension of the product. This suspension is slowly introduced into the preceding reaction mixture A. Good agitation is maintained and the temperature is kept at a maximum of 40° C. The mixture is kept at a slightly acid pH by the introduction of a sufficient quantity of a 10% solution of sodium carbonate.

The addition of 87 parts of morpholine to the suspension of the condensation product thus formed enables the last triazine chlorine atom to be substituted by a morpholine group. The acidity produced during this last phase is neutralised by the corresponding amount of a 10% solution of sodium carbonate. The acetone which distils off when the temperature of the reaction mixture reaches 70° C. is recovered.

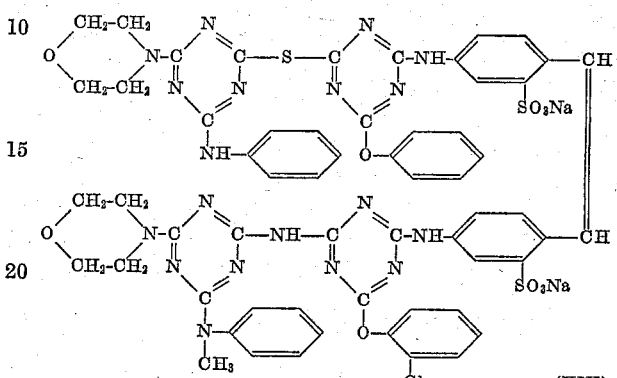

(XIX)

*Example 14*

A cotton fabric is treated with an aqueous solution, titrating 50 mg./l., of the product of Formula V, at a temperature of 35–40° C. for 15 minutes, the bath ratio being 1 to 20. The "whiteness" of the fabric is considerably improved. The shade of fluorescence of the fabric thus treated, in daylight, is particularly pleasing and possesses good stability.

*Example 15*

One part of the product obtained in Example 2 is incorporated in 1000 parts of a washing powder consisting of the following elements:

| | Parts |
|---|---|
| Sodium dodecyl-benzene-sulphonate | 100 |
| Sodium carbonate | 600 |
| Sodium polyphosphate | 280 |
| Carboxymethyl cellulose | 20 | and a sample of cotton fabric is treated for 30 minutes at the boil with a washing bath containing 50 g. per litre of the powdered mixture obtained, the ratio of the bath being 1 to 10. A considerable increase in the "whiteness" of the sample thus washed is noted as compared with the "whiteness" of a control sample treated under the same conditions with a washing powder of the same composition, but not containing the optical bleaching agent.

*Example 16*

85 parts of a 20% solution of ammonia are slowly introduced with stirring into a solution of 185 parts of cyanuric chloride in 555 parts of acetone, cooled to between 0° C. and 5° C., the reaction mixture is progressively neutralised by the addition of 530 parts of a 10% aqueous solution of sodium carbonate so as to keep a slightly acid pH throughout the condensation, then a further solution of 185 parts of cyanuric chloride in 555 parts of acetone is added to the mixture without stopping the stirring and maintaining the temperature at between 0° C. and 5° C. 530 parts of a 10% solution of sodium carbonate are added to the mixture so as to neutralise the acidity produced. Then an aqueous solution of 828 parts of the sodium salt of 4,4'-diamino-stilbene-2,2'-disulphonic acid is slowly introduced into the reaction mixture, while maintaining good agitation and allowing the temperature to rise to between 15° C. and 20° C.

The acidity resulting from the condensation is neutralised as it is produced by the addition of 1060 parts of a 10% aqueous solution of sodium carbonate. To the light yellow suspension thus obtained is added an acetone solution of 281 parts of benzoyl chloride, while raising the temperature of the mixture to about 45° C. The acidity produced is neutralised by the addition of a sufficient quantity of sodium carbonate and at this point it is verified that a sample of the suspension can no longer be diazotised. Then 210 parts of diethanolamine are introduced into the reaction mixture and the latter is heated for 5 hours under reflux, while the pH is kept slightly alkaline by the progressive addition of 1060 parts of a 10% solution of sodium carbonate.

Finally, the mixture is cooled to about 10° C., dilute hydrochloric acid is added until a weak reaction on Congo red paper is obtained, and the product is drained, washed on the filter and dried. A yellow product is obtained showing an intense blue fluorescence in aqueous solution and of the formula:

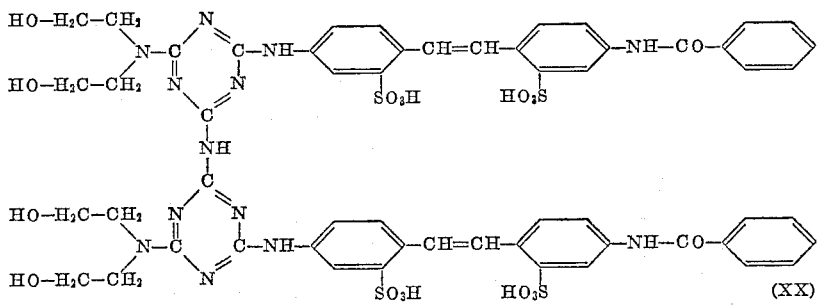

(XX)

X represents a member selected from the group consisting of the sulphur atom, the imino and ethylenediimino groups and $R_1$, $R_2$ and $R_3$ represent a member selected from the group consisting of chlorine, bromine, hydroxy, amino, mono-alkylamino, dialkylamino, hydroxyalkylamino, bis-(hydroxyalkyl)-amino, methoxyalkylamino, bis-(methoxyalkyl)-amino, morpholino, phenylamino, halogenophenylamino, sulphophenylamino, N-alkyl N-phenylamino, phenoxy and halogenophenoxy groups, said alkyl radicals having 1 to 6 carbon atoms.

2. Optical bleaching agent of the formula:

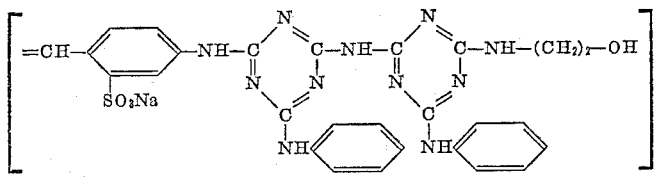

3. Optical bleaching agent of the formula:

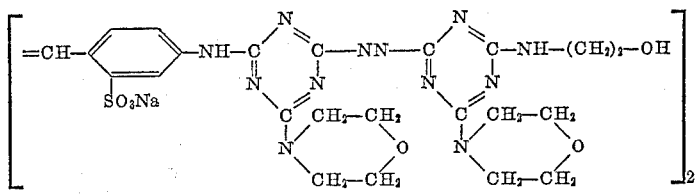

I claim:
1. Optical bleaching agents of the formula

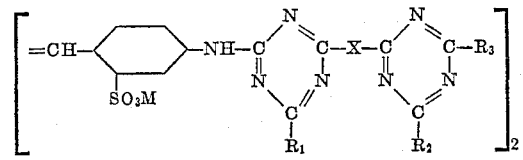

in which M represents a monovalent cation selected from the group consisting of hydrogen and alkali metal atoms, 4. Optical bleaching agent of the formula:

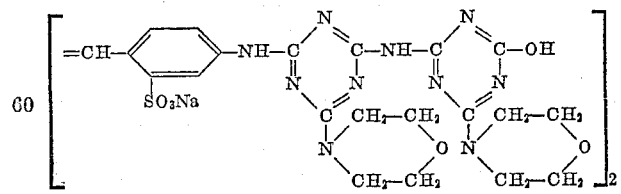

5. Optical bleaching agent of the formula:

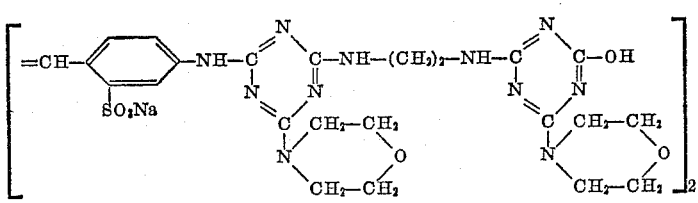

6. Optical bleaching agent of the formula:
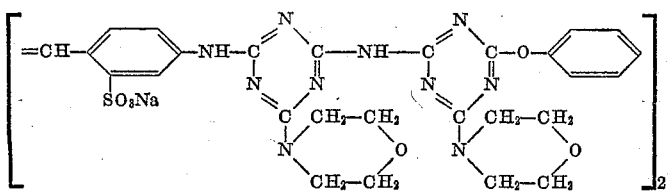
References Cited in the file of this patent
UNITED STATES PATENTS
| | | |
|---|---|---|
| 2,618,636 | Williams et al. | Nov. 18, 1952 |
| 2,658,065 | Wallace et al. | Nov. 3, 1953 |
| 2,713,046 | Williams et al. | July 12, 1955 |
| 2,813,864 | Vanier et al. | Nov. 19, 1957 |
FOREIGN PATENTS
| | | |
|---|---|---|
| 528,443 | Canada | July 31, 1956 |
| 1,200,416 | France | June 29, 1959 |